United States Patent [19]

Kilcher et al.

[11] Patent Number: 4,655,888
[45] Date of Patent: Apr. 7, 1987

[54] METHOD AND APPARATUS FOR THE ELECTROEROSIVE WORKING OF WORKPIECES

[75] Inventors: Beat Kilcher, Arcegno; Ernst Bühler, Losone; Gideon Levy, Orselina, all of Switzerland

[73] Assignee: AG fur industrielle Elektronik AGIE Losone b. Lacarno, Losone, Switzerland

[21] Appl. No.: 733,296

[22] Filed: May 10, 1985

[30] Foreign Application Priority Data

May 11, 1984 [CH] Switzerland .................. 2351/84

[51] Int. Cl.$^4$ .................. B23H 1/02; B23H 3/02; B23H 7/04; B23H 7/14
[52] U.S. Cl. .................. 204/129.43; 204/224 M; 204/DIG. 9; 204/228; 219/69 C; 219/69 P
[58] Field of Search ....... 204/129.43, 224 M, DIG. 9, 204/228; 219/69 P, 69 C

[56] References Cited

U.S. PATENT DOCUMENTS

| | | | |
|---|---|---|---|
| 3,607,689 | 9/1971 | Inoue | 204/129.43 |
| 3,655,937 | 4/1972 | Ullmann et al. | 219/69 P X |
| 3,809,847 | 5/1974 | Bell, Jr. | 219/69 P |
| 3,999,028 | 12/1976 | Saito et al. | 219/69 P X |
| 4,125,444 | 11/1978 | Inoue | 204/129.43 |
| 4,264,417 | 4/1981 | Vasiliev et al. | 204/129.43 |
| 4,310,741 | 1/1982 | Inoue | 219/69 P |
| 4,392,043 | 7/1983 | Inoue | 219/69 P |
| 4,503,309 | 3/1985 | Inoue | 219/69 C X |

Primary Examiner—Donald R. Valentine
Attorney, Agent, or Firm—Neuman, Williams, Anderson & Olson

[57] ABSTRACT

In the electroerosive machining of workpieces with the aid of a tool electrode, a pulse-like d.c. voltage is applied between the workpiece and electrode, the applied voltage being in the form of pulse groups where the pulse groups are formed of individual pulses having current amplitudes of selected magnitudes. Preferably, the individual current pulses belonging to the pulse group have successively rising amplitudes. Several individually controllable power switching circuits are connected in parallel to the work gap. The primary side of a pulse transformer connected to each power switching circuit is driven by a control device for the time shaping of the pulse groups. At least one controlled switch belonging to each power switching circuit is connected to a second control device for shaping the current pulse amplitudes.

12 Claims, 8 Drawing Figures

METHOD AND APPARATUS FOR THE ELECTROEROSIVE WORKING OF WORKPIECES

BACKGROUND OF THE INVENTION

The present invention relates to a method and an apparatus for the electroerosive working of workpieces and, more particularly, the generation of the machining pulses.

Spark-erosive working methods, particularly spark-erosive cutting methods, are largely based on empirical findings and hypotheses, because there has hitherto been no conclusive physical description of the discharge processes in the work gap. Thus, in the case of cutting processes using a wire or strip electrode, apart from the effects of gravity, a problem is also caused by vibrations formed as a result of electromagnetic, electrostatic, as well as mechanical or hydraulic effects. In view of such vibrations, and particularly in the case of finishing working conditions which requires very short discharges in the microsecond range and frequencies in the range of approximately 100 to approximately 500 kHz, particularly high demands are made on the generators used. Despite the short discharge time, such generators must supply currents of approximately 200 ampere. The time control of the discharge process has hitherto essentially taken place by the controlled switching on or off of the generator.

With the goal of minimizing disturbances of the erosion process, known generators, as for example those described in German Pat. Nos. 2,908,696 or 2,909,073, provide for the interruption of the discharge process as soon as process abnormalities occur, or when electrode wear exceeds a limit value. In controlling the energy distribution of a discharge, it is known from Swiss Pat. No. 495,812 for example to obtain shaped pulses by the additive timeshifted superimposing of pulses from individual working circuits. However, such generators are only suitable for generating relatively long pulses.

SUMMARY OF THE INVENTION

The problem addressed by the present invention is to further develop the method and apparatus for generating selectable pulse shapes for the discharge current. According to the invention, a power switching circuit is provided to supply power pulses to the work gap defined by the tool electrode and the workpiece. Preferably, the switching circuit comprises a number of individual switching circuits arranged in parallel to the work gap. A clock provides clock pulses at a predetermined frequency, and this pulse train is used as the basis to form a predetermined time pattern of trigger pulses to be supplied to the switching circuits as from stored instructions. The time pattern of trigger pulses is preferably in the form of temporally spaced groups of individual trigger pulses, where the individual trigger pulses have pulse durations and pulse intervals determined by the clock pulse frequency and the stored instructions. In addition to this control of the timing and duration of the power pulses supplied to the work gap, the magnitude of the power pulses may be controlled. In one way, the absolute magnitude of the power pulse can be set by selecting a specific number of individual switching circuits to operate. Preferably, the selection of switching circuits for operation is varied uniformly over time to minimize loading problems of the switching circuits.

The invention also makes it possible to set desired profiles for pulses as well. There is the further advantage that by distributing the energy required for an individual discharge, an increase in the specific erosion or erosion capacity is achieved and the cutting speed is considerably increased. In addition, the force acting on the electrode is improved, so that the process control can be made more efficient. Thus, an excellent uniform surface quality of the workpiece can be maintained, as well as a high erosion capacity and high cutting rate, while the erosion process can be readily controlled.

BRIEF DESCRIPTION OF THE DRAWINGS

The invention is described in greater detail hereinafter relative to illustrative embodiments and with reference to the attached drawings, which show.

DETAILED DESCRIPTION OF THE PREFERRED EMBODIMENTS

Figure 1:
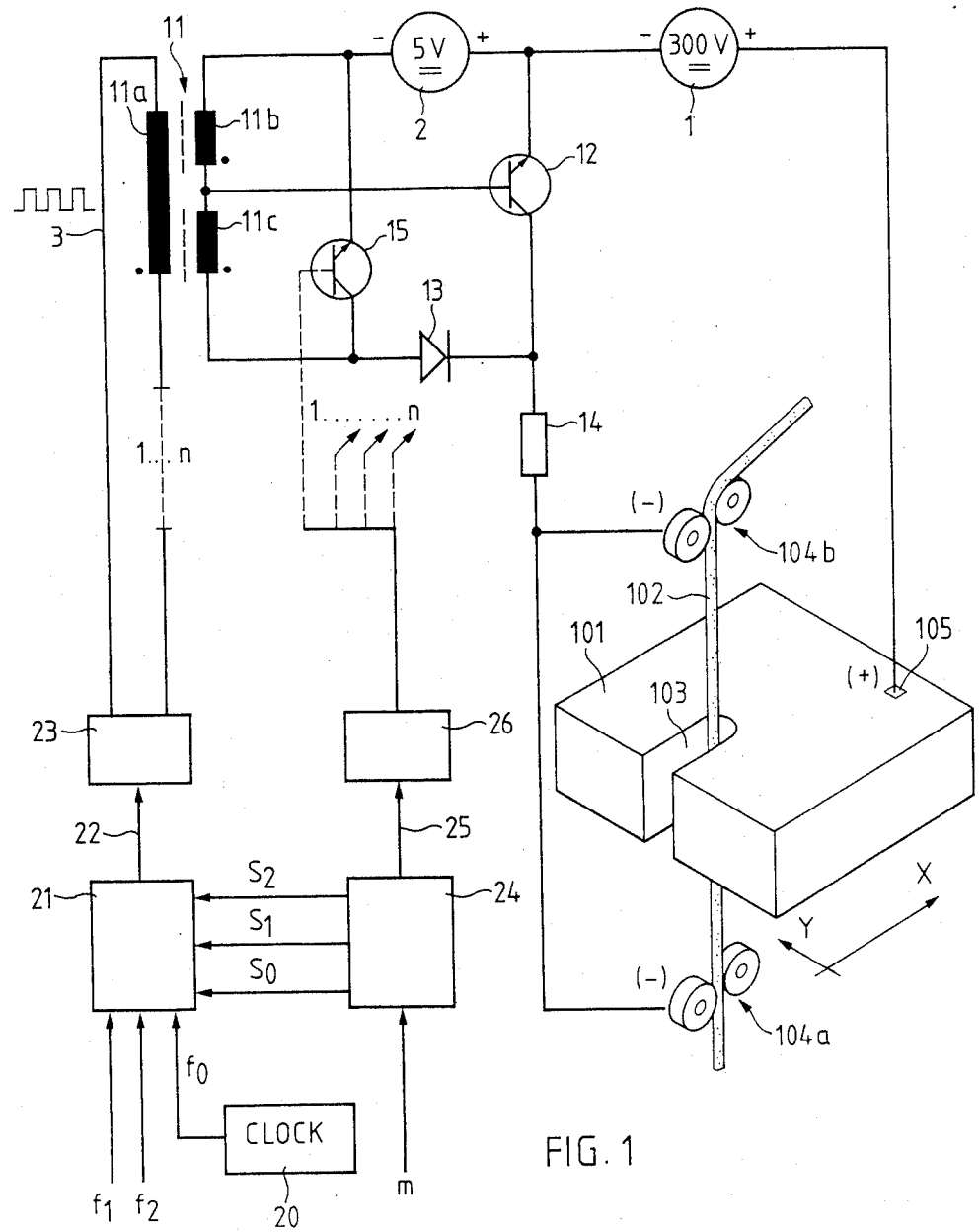
FIG. 1—a diagrammatic block representation of a generator according to a preferred embodiment of the present invention.

According to FIG. 1, a work gap 103 is cut in a workpiece 101 with the aid of a wire electrode 102. The wire electrode 102 is guided between a lower wire guide member 104a and an upper wire guide member 104b. The pattern of the cut path is determined by a diagrammatically indicated XY-coordinate control, or by some other control means, preferably a numerical control.

The positive pole (+) of a pulse generator is connected to one connecting point 105 of the workpiece 101, and in the vicinity of the upper and lower wire guides 104a, 104b, the negative pole (−) of the pulse generator is led to the wire electrode.

The pulse generator contains a main current source 1, a voltage source 2 and a pulse transformer 11 to whose primary side 11a control signals 3 are applied. The secondary sides 11b, 11c of transformer 11 are connected to electronic switches, such as switching transistors 12 or 15, as well as to a diode 13. The pulse generator is electrically connected to the wire electrode 102 through a current limiting resistor 14.

The voltage source 2 supplies a defined d.c. voltage of, say, 5 V that is applied to the base-emitter junction of switching transistor 12, so that the latter is blocked. By driving the primary side 11a of the pulse transformer 11 by control signals 3, which in the present case comprise a pulse train, corresponding secondary control voltages are produced in the two secondary windings 11b, 11c of pulse transformer 11. As a result of the control voltage at secondary winding 11b, the switching transistor 12 is opened, and the control voltage produced in the second secondary winding 11c brings about a rapid switching of switching transistor 12 across diode 13.

The pulse transformer 11 is so dimensioned and connected, that it always operates in the unsaturated range during these processes. Thus, at the time of switching off control signals 3, switching transistor 12 is returned very rapidly to the non-conducting state through the action of voltage source 2. The second switching transistor 15 is used for short-circuiting the two secondary sides 11b, 11c of pulse transformer 11, to block any further switching action of switching transistor 12.

In a preferred embodiment several (a ... n) such power switching circuits, including a pulse transformer 11, the controlled switches, in this case switching transistors 12, 15, a main current source 1, a voltage source 2 and a diode 13, are connected in parallel and are all controlled in the manner described hereinafter by corresponding control signals 3.

Figure 2:
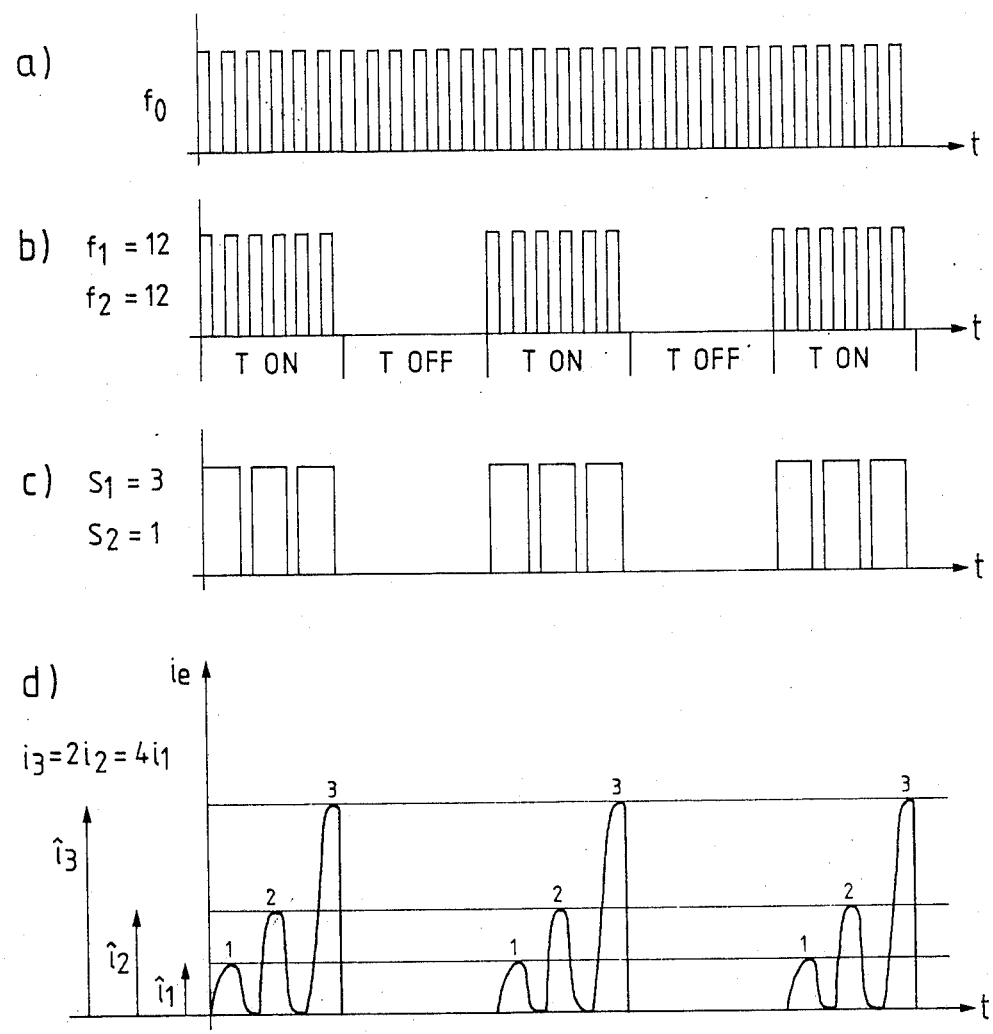
FIGS. 2a to 2d—timing charts for pulse trains generated in accordance with the generator of FIG. 1.

For the purpose of controlling the aforementioned power switching circuits, a high frequency clock generator 20 supplies a pulse-like basic clock cycle with a pulse repetition frequency of, for example, 5 MHz across a clock line $f_0$ to a pulse evaluation means 21. Such a pulse train is represented in FIG. 2a. The pulse evaluation means 21, which can essentially be constructed as a counting circuit, acts under the influence of control signals on control signal lines $f_1$ and $f_2$ to pass through a clearly defined number of clock pulses as is shown in FIG. 2b as the basis for a further pulse shaping. During a period $T_{on}$, which is determined by the control signal on control signal line $f_1$, the pulses arriving on the clock line $f_0$ with the fundamental frequency shown in FIG. 2a are passed for further shaping. This is followed by an interval $T_{off}$, whose duration is determined by the control signal on line $f_2$. At the end of a period $T_{on}$ the pulse evaluation means 21 supplies a synchronization control signal S0 to a pulse shape storage 24, e.g. an EPROM. This synchronization signal leads to a store rest and leads to the polling of a specific stored, time pulse shaping program for the formation of the time pattern. A certain number of such programs is stored in the pulse shape storage 24. The program is selected with the aid of a selection control signal m, which is supplied by a control or servo-system (not shown) connected to the device. The pulse evaluation means 21 is controlled by means of control lines S1, S2 in accordance with the selected pulse shape. FIG. 2c shows an example of a pulse shaping time pattern. In the present case, S1=3 and three timing intervals are used for shaping an individual pulse while S2=1 and one timing interval is used for the pulse interval. The resulting time-shaped pulse signal is supplied across the output line 22 of pulse evaluation means 21 to an amplifying unit 23.

For further pulse shaping with respect to the amplitude, various patterns for the amplitude configuration of pulse groups are stored in the pulse shape storage 24. Preferably, these amplitude patterns are linked with the time patterns in the pulse shape storage 24, so that they can be polled with the same control signal m. This means that after reset the pulse shape storage 24, in response to a S0 control signal, supplies an amplitude pattern for the current amplitudes on output line 25, the amplitude pattern appearing as a function of the time pulse shaping signals on lines S1 and S2. This amplitude pattern is amplified in an amplifier 26 and is supplied to the second electronic switches 15 of the parallel-positioned power switching circuit. Such a number of power switching circuits (a ... n) is controlled that the resulting sum of pulse currents corresponds to the desired current amplitude pattern. FIG. 2d is an example of such a current amplitude pattern, in which the second pulse has twice the amplitude of the first pulse and the third pulse has four times the amplitude of the first pulse.

Preferably, the selection of the particular power switching circuits participating in the pulse shaping can be made through the control line 25 in the nature of a permutation, so that the ON-phases are as uniformly distributed as possible over all the existing power switching circuits. This leads to a uniform thermal loading of the participating power switching circuits. Thus, the number of such circuits is preferably chosen in such a way that it is larger than the maximum number required for producing a pulse pattern.

Figure 3:
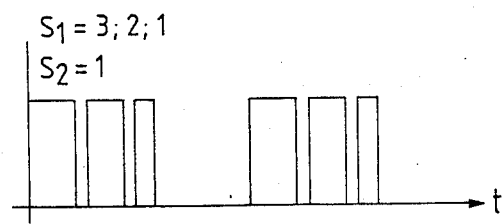
FIG. 3—timing chart for the pulse train generated by another embodiment of the present invention.

Differing from the example of FIG. 2c, the individual pulses belonging to the pulse train can also have different widths, as indicated in FIG. 3. The intervals between the individual pulses belonging to a train can also differ. Finally, the interval $T_{off}$ between the individual pulse groups can vary, provided that this is advantageous for the desired cutting behaviour.

Figure 4A:
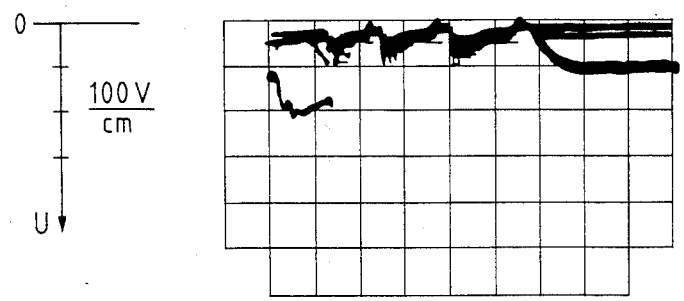
FIGS. 4a, 4b—oscillograms of the voltage and current profiles of machining pulses generated by a preferred embodiment.
Figure 4B:
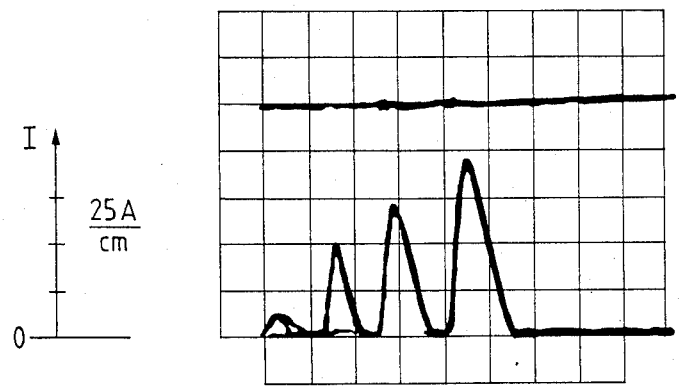

FIG. 4a shows a voltage oscillogram and FIG. 4b a current oscillogram of a discharge, in each case comprising four individual pulses, at the work gap 103 in FIG. 1. According to this example (used for cutting steel), the current pulse train comprises roughly triangular, amplitude-rising individual pulses, with roughly identically long intervals between them. The voltage gradient according to FIG. 4a shows several superimposed voltage curves for several successive discharges. For the first pulse, there is a certain no-load frequency, which does not occur for the second and third pulses. This indicates that not all primary pulses of successive discharges definitely lead to an ignition. In fact, in the following pulses there are no further no-load signals, so that the effectiveness of the discharges is apparent. All the discharges take place in a single discharge channel. Thus, there is no need for a new ionization start with a high ignition voltage.

Practical tests have proved that such pulse trains lead to a significant rise in the specific erosion rate. This can be explained by the fact that the first starting pulse, even if it does not lead to a discharge, centers the wire electrode in a favourable position in the work gap, as a result of the effect of the electromagnetic forces arising therefrom. Thus, subsequent discharges can be formed particularly effectively. The individual pulses of a discharge lead to a local, strongly concentrated erosion but, owing to the increasing current intensity thereof, also lead to increasing repulsion forces which act against the mass forces of the wire. In the pulse intervals, in which the current need not necessarily drop to zero, repulsion forces briefly decline, so that there is a more precise guidance of the wire. In addition, in the pulse intervals the current drop leads to a pressure drop in the discharge channel, which aids the ejection of the eroded material. The following pulse then strikes a clean material surface, which is uniform with respect to the electrical conditions. Finally, owing to the improved conditions and the increased current intensity, completely satisfactory erosion can take place, even over larger surface distances.

What is claimed is:

1. For the electroerosive working of a conductive workpiece by a tool electrode in an electroerosive plant including a pulse generator having a plurality of selectively operable power switching circuits arranged in parallel to a work gap formed between the tool electrode and the workpiece, a method for generating machining pulses applied to the work gap comprising the steps of storing a set of manifestations indicative of the desired shape and occurrence of machining pulses for each of a plurality of machining conditions; selecting one of said sets of manifestations in consideration of the actual machining conditions; generating a pulse train of clock pulses at a fundamental frequency; forming the pulse train into temporally spaced groups of control pulses in accordance with said selected set of manifestations; applying said control pulses to the power switching circuits; and rendering operable select ones of the power switching circuits in consideration of said selected set of manifestations to establish the amplitude of the current supplied to the work gap.

2. A method according to claim 1 wherein the step of forming control pulses comprises forming control pulses of predetermined pulse width and having predetermined pulse intervals in consideration of the clock pulse frequency.

3. A method according to claim 1 wherein the plurality of power switching circuits are rendered operable for switching in a substantially uniform manner over time.

4. A method according to claim 1 wherein the power switching circuits are rendered operable in accordance with said selected set of manifestations to shape the profile of the current pulse supplied to the gap.

5. In an electroerosive machining plant for machining a conductive workpiece with a tool electrode, a pulse generator comprising a plurality of power switching circuit means arranged in parallel to a workgap defined between the tool electrode and the conductive workpiece, each switching circuit means having a conductive state and a nonconductive state for supplying power from a power supply to the work gap when the switching circuit means is in a conductive state; a clock means for generating clock pulses of a predetermined frequency; pulse evaluation means connected to the clock means for receiving the clock pulses and generating temporally spaced groups of control pulses for switching the power switching circuit means to a selected state, the pulse evaluation means forming the control pulses in accordance with the pulse frequency of the clock means on the basis of a predetermined time pattern; and disabling means connected to the power switching circuit means, operable to enable selected ones of the power switching circuit means to respond to said control pulses.

6. An electroerosive machining plant according to claim 5 further comprising a pulse shaping means connected to the pulse evaluation means for supplying control signals to direct the generation of the control pulses in the pulse evaluation means on the basis of the clock pulses and a predetermined pulse time pattern.

7. An electroerosive machining plant according to claim 5 in which the disabling means is adapted to regulate the shape of current pulses supplied to the work gap by the power switching means.

8. An electroerosive machining plant according to claim 5 wherein each power switching circuit means comprises an electronic switch means connected in series with a power source and in parallel with the work gap; a pulse transformer means, a primary winding of which is connected to the pulse evaluation means for receiving the control pulses and a secondary winding of which is connected to the electronic switch means so that the electronic switch means is placed in the conductive state when a control pulse is applied to the pulse transformer means; and the disabling means comprises an electronic switch means connected in parallel across the secondary winding and operable to be placed in a conductive state to effectively provide a short circuit across the secondary winding.

9. In an electroerosive machining plant for machining a conductive workpiece with a tool electrode, a pulse generator comprising a plurality of power switching circuits arranged in parallel to a work gap defined between the tool electrode and the conductive workpiece, each switching circuit having a conductive state and a nonconductive state for supplying power from a power supply to the machining work gap when the switching circuit is in the conductive state and including a means for receiving a control pulse to switch the switching circuit to the conductive state and a selectively operable disabling means for forcing the switching circuit to the nonconductive state; a clock means for generating clock pulses of a predetermined frequency; pulse evaluation means connected to the clock means for receiving the clock pulses and supplying temporally spaced groups of control pulses to the switching circuit trigger means; and pulse shaping means connected to the pulse evaluation means for supplying control signals to the pulse evaluation means to direct the formation of the control pulses on the basis of the clock pulse frequency and a desired time pattern, the pulse shaping means also being connected to the switching circuit disabling means for disabling selected ones of the power switching circuits in a predetermined manner.

10. An electroerosive machining plant according to claim 9 wherein the pulse shaping means is adapted to variously disable selected switching circuits so that the operation of the switching circuits is distributed in a uniform manner over all the switching circuits over time.

11. An electroerosive machining plant according to claim 9 wherein each power switching circuit comprises a first switching transistor having a conductive state and a nonconductive state; the trigger means is a pulse transformer having a primary winding and two secondary windings connected in series in the same winding polarity, the primary winding being connected to the pulse evalution means for receiving the control pulses, the collector of the first switching transistor being connected to the high side of the secondary windings, the emitter of the first switching transistor being connected to the low side of the secondary windings, and the base of the first switching transistor being connected to the center tap of the secondary windings; and the disabling means comprises a second switching transistor connected in parallel with the secondary windings of the pulse transformer and operable to be placed in a conductive state to provide a short circuit across the secondary windings.

12. An electroerosive machining plant according to claim 11 wherein each power switching circuit further comprises a voltage source operatively connected across the base-emitter junction of the first switching transistor to place the first switching transistor in the nonconducting state when no control pulse is applied to the pulse transformer.

* * * * *